US008761001B2

(12) United States Patent
Mao et al.

(10) Patent No.: US 8,761,001 B2
(45) Date of Patent: Jun. 24, 2014

(54) METHOD AND NETWORK SYSTEM FOR IMPLEMENTING USER PORT ORIENTATION IN MULTI-MACHINE BACKUP SCENARIO OF BROADBAND REMOTE ACCESS SERVER

(75) Inventors: Wei Mao, Guangdong Province (CN); Tong Leng, Guangdong Province (CN); Zhining Ye, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 340 days.

(21) Appl. No.: 13/258,201

(22) PCT Filed: May 10, 2010

(86) PCT No.: PCT/CN2010/072580
§ 371 (c)(1),
(2), (4) Date: Nov. 9, 2011

(87) PCT Pub. No.: WO2011/035585
PCT Pub. Date: Mar. 31, 2011

(65) Prior Publication Data
US 2012/0170448 A1    Jul. 5, 2012

(30) Foreign Application Priority Data

Sep. 23, 2009    (CN) .......................... 2009 1 0178111

(51) Int. Cl.
*H04L 12/26*    (2006.01)
(52) U.S. Cl.
USPC ....................................... 370/220
(58) Field of Classification Search
None
See application file for complete search history.

(56) References Cited

U.S. PATENT DOCUMENTS

| 2005/0021574 | A1* | 1/2005 | Miller et al. ................. 707/204 |
| 2008/0239946 | A1* | 10/2008 | Morita ......................... 370/217 |
| 2010/0131660 | A1* | 5/2010 | Dec et al. ..................... 709/228 |
| 2011/0228669 | A1* | 9/2011 | Lei et al. ...................... 370/219 |
| 2012/0008635 | A1* | 1/2012 | Kuo et al. .................... 370/410 |
| 2012/0011392 | A1* | 1/2012 | Hatasaki et al. ............. 714/4.11 |

FOREIGN PATENT DOCUMENTS

| CN | 1567737 A | 1/2005 |
| CN | 1780231 A | 5/2006 |
| CN | 1842020 A | 10/2006 |

OTHER PUBLICATIONS

International Search Report for PCT/CN2010/072580 dated Jul. 27, 2010.

* cited by examiner

*Primary Examiner* — Chirag Shah
*Assistant Examiner* — Amar Persaud
(74) *Attorney, Agent, or Firm* — Ling Wu; Stephen Yang; Ling and Yang Intellectual Property LLC

(57) ABSTRACT

A method and network system for implementing user port locating in multi-machine backup scenario of broadband remote access server (BRAS) are disclosed. The method comprises: configuring master port in each backup group as user access port and synchronizing information of taking the maser port as user access port to the backup port in the backup group; a remote authentication dial in user service (RADIUS) server configuring access port information, which is set as the master port in the backup group, for the user; processing master-backup switch if the master port is abnormal and the user accessing the line from the corresponding backup port; the BRAS corresponding to the backup port encapsulating the authentication message including the access line information about digital subscriber line access multiplexer of the user access and taking the maser port as the user access port, and sending the authentication message to the RADIUS server.

8 Claims, 3 Drawing Sheets

METHOD AND NETWORK SYSTEM FOR IMPLEMENTING USER PORT ORIENTATION IN MULTI-MACHINE BACKUP SCENARIO OF BROADBAND REMOTE ACCESS SERVER

TECHNICAL FIELD

The present invention relates to network communication technology, and more specifically, to a method and network system for implementing user port locating in a multi-machine backup scenario of broadband remote access server (BRAS).

BACKGROUND OF THE RELATED ART

The service control layer in broadband metropolitan area network (MAN) is a unique level in the service access network connecting with the core switching network, in which the BRAS plays an important role. The BRAS in the convergence layer at the edge of the broadband MAN is responsible for the authentication of all kinds of broadband access users, billing gateway and the user's service control gateway, and it is mainly responsible for functions such as service access control, user management, and address management.

With requirements for high quality of the services provided by the network, there are higher requirements for performance and reliability of service control layer BRAS products, the functions of the BRAS products and their positions in the network results in that the BRAS has a high reliable network, so the concept of BRAS multi-machine backup comes into being. In networking applications, multiple BRAS equipments will be deployed in the service control layer, and the multiple equipments have master-backup redundancy and user information backup capabilities via service configuration, so as to achieve fast switching and service recovery when the equipment fails, thus to fulfill user unaware services guarantee. Meanwhile, it solves network vulnerabilities due to the single point-failure.

BRAS multi-machine backup means deploying N+1 BRAS products in the control layer of the network to achieve N: 1 backup, that is, N BRAS equipments work as the master equipments to bear services, the rest one BRAS equipment works as a backup equipment to synchronously store user information, multiple ports of the N equipments are backed up to one port of the rest one equipment. Because the probability that multiple equipments are abnormal concurrently is far less than the probability that multiple ports of one equipment are abnormal, generally, the ports 1 of N equipments are backed up to the port 1 of the backup equipment rather than the multiple ports of the same equipment are backed up to one port of the backup equipment in applications. One port of the backup equipment distinguishes the N ports of the master equipments by dividing a Virtual Local Area Network (VLAN). In N+1 backups, two ports that are in master-backup relationship belong to one backup group, and two equipments that mutually establish a master-backup relationship between them belong to one backup equipment group. At work, N of the N+1 equipments are configured to be in the master status while the rest one in the backup state through negotiation or manual configuration, the master equipments are used to control the user access and record user information, and to back up the user information to the backup equipment in real-time synchronization or bulk synchronization. When the master equipment fails, a master-backup switching can be rapidly implemented, since the user information has already been backed up to the equipment in backup state, thus the users cannot aware that the equipment is in the process of master-backup switching and the service quality is guaranteed.

In the BRAS multi-machine backup application scenarios, users access the convergence equipment through the access network, and the convergence equipment uplinks to multiple BRAS equipments, multiple backup groups of the multiple BRAS equipments negotiate the master-backup relationship through the Virtual Router Redundancy Protocol (VRRP, refer to RFC2338) to achieve N: 1 backups among the multiple BRAS equipments. Assuming three BRAS equipments are equipment A, equipment B, and equipments C, and port a of the equipment A and port b of the equipment B are backed up to port c of the equipment C, there are backup groups ac and bc and backup equipment groups AC and BC. In the work scheme of N: 1 backup, for all users, the equipments A and B are equipments in master state, while the equipment C is an equipment in backup state, that is, when working normally, the ports a and b are the master ports to bear user services, while the port c is the backup port that does not bear user services but synchronously stores the user information. When the port a of the equipment A fails, the port c in the backup group ac is switched to be a master port, right now, the equipment B and the equipment C are equipments in master state, while the equipment A is an equipment in backup state.

To date, the method for the BRAS access user port locating is: to acquire the access line information of the down-linked Digital Subscriber Line Access Multiplexer (DSLAM) and the port line information when the user accesses the BRAS, and then all the information are packaged and sent to a Remote Authentication Dial In User Service (RADIUS) server for authentication so as to check whether the user access line information is correct or not. In BRAS multi-machine backup applications, the switching between master and backup ports in the backup group will change the user access line information, resulting in authentication failure, thus the original method for the user port locating is not feasible any more. Reasons of the authentication failure are: the BRAS equipment activates the user port locating functionality in the BRAS multi-machine backup scenarios so as to check the access line information during the user authentication. In the work scheme of N: 1 of the BRAS equipments, when the master port of one backup group is abnormal, the backup group switches, the original master port is switched to be a backup port, while the original backup port is switched to be a master port, for one access user, the process of the user port locating is:

1. when the master port is in normal state, the user accesses from the master port of the master equipment, the master equipment constructs a RADIUS user access line information attribute message from the DSLAM line information brought by the user and the access port line information of the master equipment, and sends the message to the RADIUS server for authentication;

2. The RADIUS server configures access line information for each user, and after the user access authentication message (including the user access line information attribute message) is sent from the BRAS to the RADIUS server, the RADIUS server inspects the line according to the user line information in the user access line information attribute message, if the information matches, then the authentication is passed;

3. when the master port of the master equipment is in abnormal state, the backup group switches, and when the backup port of the backup equipment is switched to be a master port, if the same user accesses the line again, the user will access from the backup port of the backup equipment;

4. according to the DSLAM line information brought by the user and the access port line information of the backup equipment, the backup equipment constructs a RADIUS user access line information attribute message and sends the message to the RADIUS server for authentication;

5. The RADIUS server inspects the line according to the user line information in the user access line information attribute message, meanwhile, since the BRAS access information brought by the user has changed, the line inspection does not pass, the user authentication fails, and the user can not access the line.

Since the physical access equipment and access port have changed when the user accesses the line again after the backup group switches, while the access line information set by the authentication equipment for each user is fixed, thus there is a problem, i.e., when the user access authentication is successful before the backup group switches, the authentication will fail when the same user accesses the line again after the backup group switches.

CONTENT OF THE INVENTION

The present invention provide a method and network system for implementing user port locating in a BRAS multi-machine backup scenario, so as to solve the problem that the authentication fails due to the user port locating circuit information change after the backup group switches.

In order to solve the abovementioned technical problem, the present invention provides a method and network system for implementing user port locating in the BRAS multi-machine backup scenario, and said BRAS multi-machine backup scenario is: more than two BRAS equipments are master equipments, one BRAS equipment is the backup equipment, and multiple ports of the same master equipment are backed up to multiple different ports of the backup equipment. The ports are mutually in a master-backup relationship belong to one backup group, and the method comprises:

Configuring the master port in each backup group as the user access port, and synchronizing the information of taking the master port as the user access port to the backup port in the backup group;

The Remote Authentication Dial In User service (RADIUS) server configuring the access port information for the users, where the access port information is set as the master port in the backup group; and If the master port is abnormal and a master-backup switching is executed, the user accessing the line from the corresponding backup port, and the BRAS equipment corresponding to the backup port encapsulating an authentication message including the access line information about the DSLAM of the user access and taking the master port as the user access port, and sending the authentication message to the RADIUS server.

The abovementioned method also comprises: one port of said backup equipment distinguishing the ports of different master equipments by dividing the virtual local area network.

The abovementioned method also comprises: said backup group negotiating the master-backup relationship via the VRRP.

The present invention also provides a network system, the network system comprises multiple broadband remote access servers (BRAS) and a Remote Authentication Dial In User Service (RADIUS) server, where two or more BRAS equipments are set as master equipments, while one BRAS is set as a backup equipment. Multiple ports of the same master equipment are backed up to multiple different ports of the backup equipment, and the ports that are mutually in the master-backup relationship belong to one backup group, wherein, Each master equipment is configured as: receiving the information of taking the master port as the user access port, and synchronously sending the information to the abovementioned backup equipment; encapsulating an authentication message including the access line information about the DSLAM of the user access and taking the abovementioned master port as the user access port, and sending the authentication message to said RADIUS server; when the master port is abnormal, sending a switching message to the backup equipment.

Said backup equipment is configured as: storing the information synchronized and sent from the master equipment; executing the master-backup switching after receiving the switching information, and the user accessing the line from the backup port corresponding to the backup equipment, encapsulating an authentication message including the access line information about the DSLAM of the user access and taking the corresponding master port as the user access port, and sending the authentication message to the RADIUS server;

Said RADIUS server is configured as: the access port information configured for the user is set as the master port of the backup group; inspecting the line based on the user line information after receiving said authentication message.

The network system also has the following feature: the backup equipment is also configured as: one port of the backup equipment distinguishing the ports of different master equipments by dividing the virtual local area network.

The network system also has the following feature: the master equipment and the backup equipment are also configured as: negotiating the master-backup relationship between the ports in the backup group via the VRRP.

In summary, the present invention provides a method and network system for implementing user port locating in the BRAS multi-machine backup locating scenario, the method for implementing the user port locating in the present invention comprises: reserving one port as the master port of the user access line when configuring user ports in the backup group, and synchronizing the information to another port in the same backup group in real time, and the user access of the same backup group using the same BRAS access line information, so as to shield the change in the user access line information due to the switching of the backup group to avoid user authentication failure. Compared with the port locating technology in the prior art, the method of the present invention avoids the authentication failure due to the switching of the backup group and achieves the application of user port locating in the multi-machine hot backup scenario.

PREFERRED EMBODIMENTS OF THE PRESENT INVENTION

The preferred embodiment of the technical scheme of the present invention will be illustrated in further detail with combination of the accompanying figures.

Figure 1:
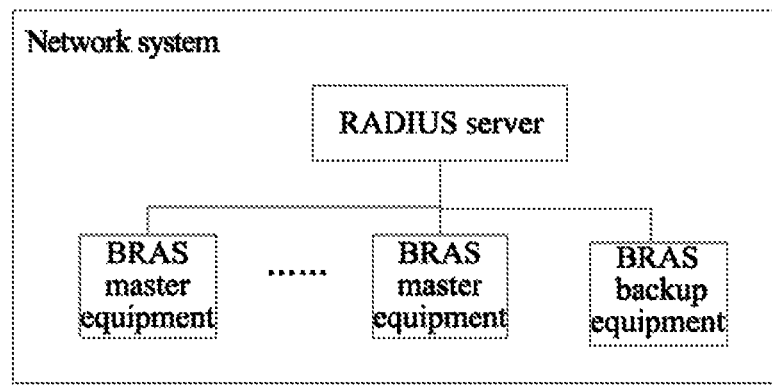
FIG. 1 illustrates the network system in accordance with an embodiment of the present invention.

FIG. 1 illustrates the network system in accordance with an embodiment of the present invention, as shown in FIG. 1, the network system of this embodiment comprises multiple BRAS equipments and one RADIUS server, wherein, two or more BRAS equipments are the master equipments and one BRAS equipment is the backup equipment, multiple ports of the same one master equipment are backed up to multiple different ports of the backup equipment, and the ports that are mutually in the master-backup relationship belong to one backup group, and the backup group negotiates the master-backup relationship via the VRRP, wherein, Each master equipment is configured as: receiving the information of taking the master port as the user access port, and synchronously sending the information to the backup equipment; encapsulating an authentication message including the access line information about digital subscriber line access multiplexer of the user access and takes the master port as the user access port, and sending the authentication message to said RADIUS server; when the master port is abnormal, sending a switching message to the backup equipment.

Said backup equipment is configured as: storing the information synchronously sent by the master equipment; executing the master-backup switching after receiving the switching information, and the user accessing the line from the backup port corresponding to the backup equipment, encapsulating an authentication message including the access line information about digital subscriber line access multiplexer of the user access and taking the corresponding master port as the user access port, and sending the authentication message to the RADIUS server;

Said RADIUS server is configured as: the access port information configured for the user is set as the master port of the backup group; inspecting the line based on the user line information after receiving said authentication message, and if the user line information matches, the authentication is passed.

Figure 2:
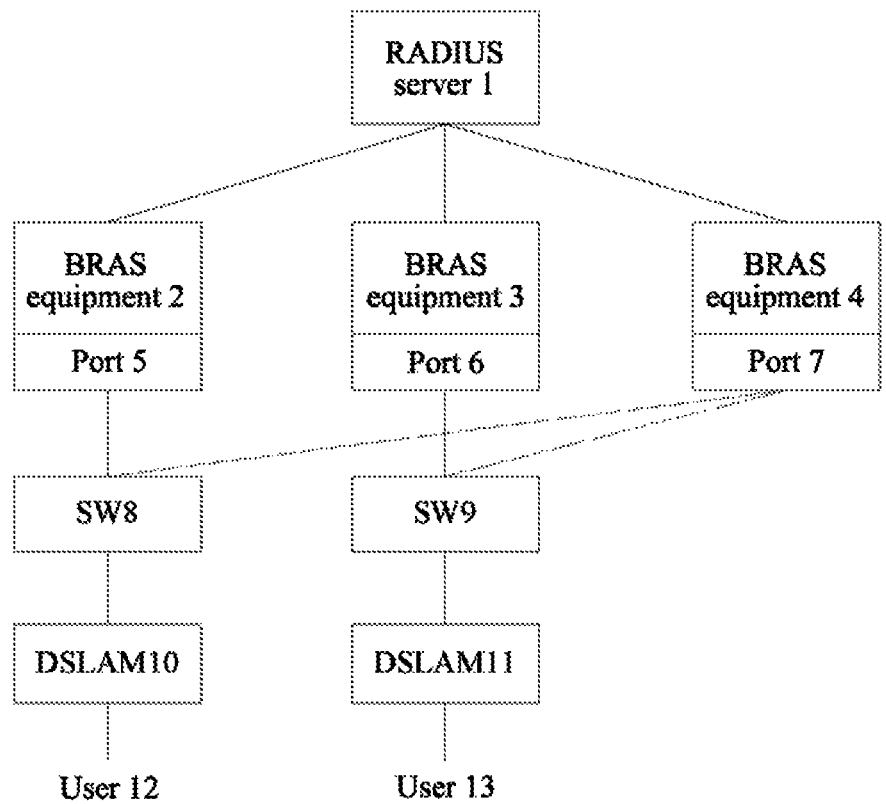
FIG. 2 is an application scenario of user port locating in the BRAS multi-machine backup.
Figure 3:
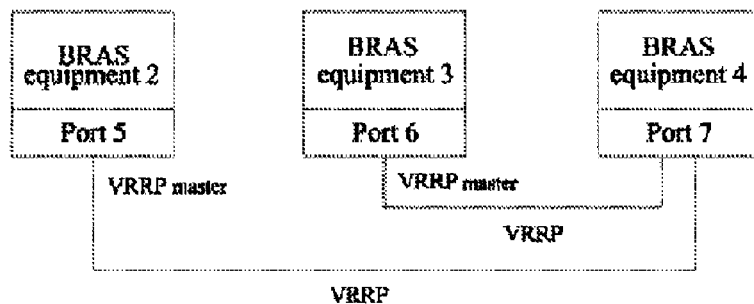
FIG. 3 illustrates the backup group relationship in the BRAS multi-machine backup.

FIG. 2 is an application scenario of the user port locating in the BRAS multi-machine backup in accordance with an embodiment of the present invention, as shown in FIG. 2, the application scenario of this embodiment is: the RADIUS Server 1 is the authentication server of the BRAS equipment and connects with the BRAS equipment 2, the BRAS equipment 3 and the BRAS equipment 4. The ports 5, 6 and 7 of these three BRAS equipments achieve 2:1 multi-machine hot backup function. The BRAS equipment down links to the SW 8 and SW 9 (switch device), and then accesses the user 12 and the user 13 via the DSLAM 10 and DSLAM 11. The backup relationship among the three BRAS equipments is shown as FIG. 3, and the port 5 of the BRAS equipment 2 and the port 7 of the BRAS equipment 4 belong to one backup group, and the port 5 is the master port; the port 6 of the BRAS equipment 3 and the port 7 of the BRAS equipment 4 belong to one backup group, and the port 6 is the master port.

Figure 4:
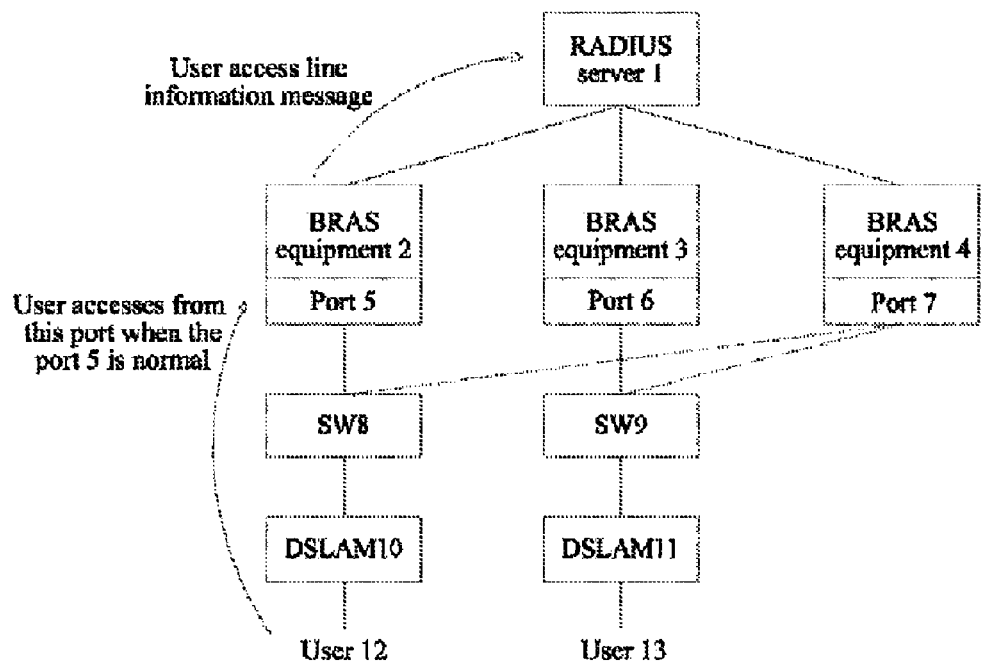
FIG. 4 illustrates the user access before the master port is abnormal in the BRAS multi-machine backup.
Figure 5:
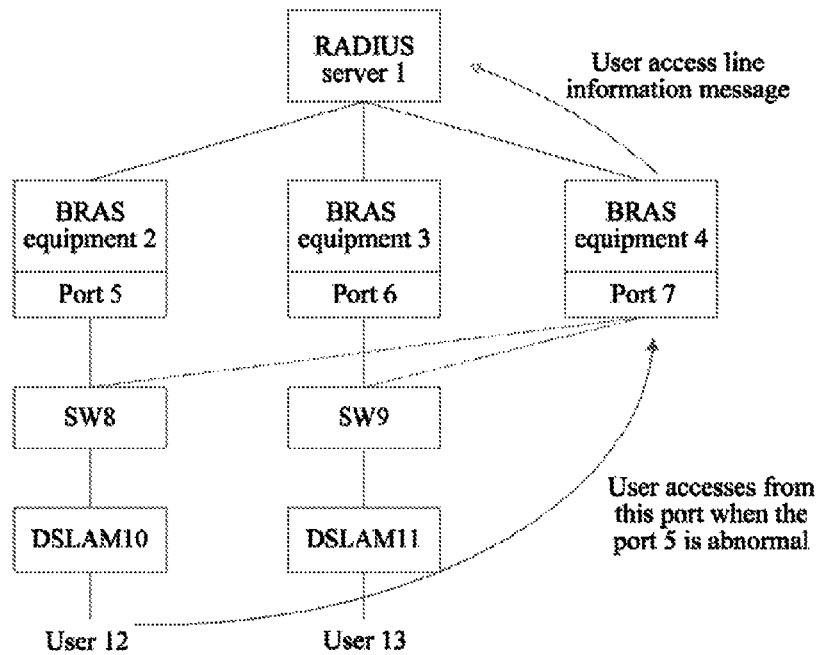
FIG. 5 illustrates the user access after the master port is abnormal in the BRAS multi-machine backup.

For the user 12, before the master port is abnormal, the user accesses from the port 5 of the BRAS equipment 2, as shown in FIG. 4, after the master port is abnormal, the user accesses from the port 7 of the BRAS equipment 4, as shown in FIG. 5.

Figure 6:
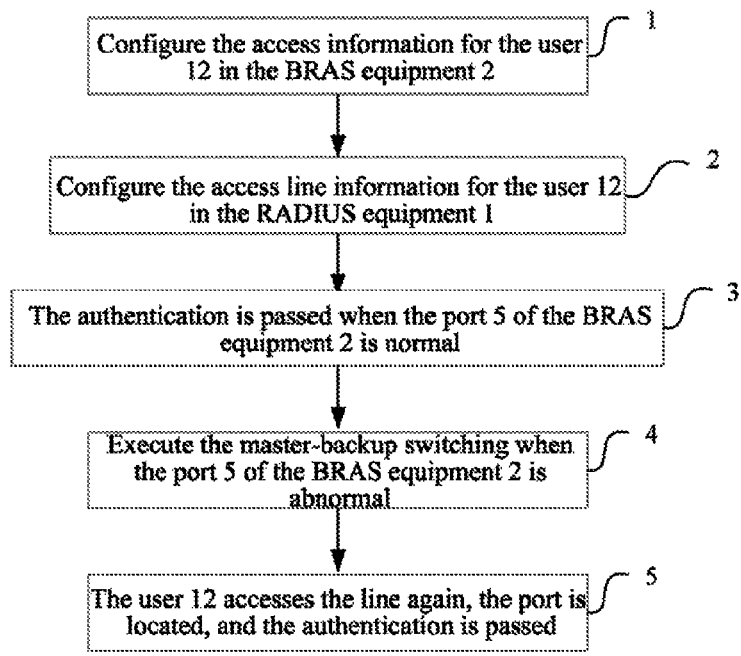
FIG. 6 is a flow chart of the method for implementing user port locating in the BRAS multi-machine backup scenario in accordance with an embodiment of the present invention.

FIG. 6 is a flow chart of the method for implementing user port locating in the BRAS multi-machine backup scenario in accordance with an embodiment of the present invention, as shown in FIG. 6, the method of this embodiment comprises:

Step 1: configuring the access information for the user 2 in the BRAS equipment 2, configure the port 5 as the master port of the user access line, and synchronizing the access line information of the port 5 to the port 7 of the BRAS equipment 4 in real time, and the port 7 storing the information;

Step 2: configuring the access line information for the user 12 in the RADIUS equipment 1, and the BRAS port information being set as the access line information, the port 5 of the BRAS equipment 2;

Step 3: when the port 5 of the BRAS equipments 2 is normal, the user 12 accessing from the port 5, and the BRAS equipment 2 encapsulating the access line information about the DSLAM 10 and the port 5 of the BRAS equipment 2 into a RADIUS user access line information attribute message (included in the authentication message), and sending the message to the RADIUS server for authentication, the RADIUS server finding out that the information matches, and the authentication being passed;

Step 4: If the port 5 of the BRAS equipment 2 is abnormal, switching the port 7 of the BRAS equipment 4 as a master port after detecting that the port 5 of the BRAS equipment 5 is abnormal via the VRRP, and the BRAS user access port information at the port 7 is set as the port 5 of the BRAS equipment 2;

Step 5: the user 12 connects again and accesses from the port 7 of the BRAS equipment 4, and the BRAS equipment 4 encapsulating the access line information about the DSLAM 10 and the port 5 of the BRAS equipment 2 into a RADIUS user access line information attribute message, and sending the message to the RADIUS server for authentication, the RADIUS server finding out that the information matches, and the authentication being passed.

Of course, the present invention has a variety of other embodiments. For those skilled in the field, various corresponding modifications and variations can be made without departing from the spirit and essence of the present invention, however, any modifications, equivalents or variations made within the spirit and rule of the present invention should fall in the scope of the claims of the present invention.

Industrial Applicability

Compared with the port locating technology in the prior art, the method of the present invention avoids the authentication failure due to the switching of the backup group and achieves the application of user port locating in the multi-machine hot backup scenario.

What is claimed is:

1. A method for implementing user port locating in a broadband remote access server multi-machine backup scenario, wherein, said broadband remote access server multi-machine backup scenario is that: more than two broadband remote access server equipments are master equipments, and one broadband remote access server equipment is a backup equipment, and a plurality of ports of the same master equipment are backed up to a plurality of different ports of the backup equipment, the ports that are mutually in a master-backup relationship belong to one backup group, and the method comprising:

configuring a master port in each backup group as a user access port, and synchronizing information of taking the master port as the user access port to the backup port in the backup group;

a remote authentication dial in user service server configuring access port information for the users, where the access port information is set as the master port in the backup group; and if the master port is abnormal and a master-backup switching is executed, the user accessing the line from the corresponding backup port, and the broadband remote access server equipment corresponding to the backup port encapsulating an authentication message including access line information about digital subscriber line access multiplexer of the user access including the master port number and taking the master port as the user access port, and sending the authentication message to the remote authentication dial in user service server.

2. The method of claim 1, further comprising: one port of said backup equipment distinguishing the ports of different master equipments by dividing a virtual local area network.

3. The method of claim 2, further comprising: said backup group negotiating the master-backup relationship via a virtual router redundancy protocol.

4. The method of claim 1, further comprising: said backup group negotiating the master-backup relationship via a virtual router redundancy protocol.

5. A network system, comprising a plurality of broadband remote access servers and a remote authentication dial in user service server, wherein two or more broadband remote access server equipments are set as master equipments, while one broadband remote access server is set as a backup equipment, and a plurality of ports of the same master equipment are backed up to a plurality of different ports of the backup equipment, and the ports that are mutually in a master-backup relationship belong to one backup group, each master equipment is configured as: receiving information of configuring a master port as a user access port, and synchronously sending the information to said backup equipment; encapsulating an authentication message including access line information about digital subscriber line access multiplexer of the user access and taking the master port as the user access port, and sending the authentication message to said remote authentication dial in user service server; when the master port is abnormal, sending switching information to the backup equipment, said backup equipment is configured as: storing the information synchronously sent by the master equipment; executing the master-backup switching after receiving the switching information, and the user accessing the line from the backup port corresponding to the backup equipment, encapsulating an authentication message including access line information about digital subscriber line access multiplexer of the user access including the master port number and taking the corresponding master port as the user access port, and sending the authentication message to the remote authentication dial in user service server;

said remote authentication dial in user service server is configured as: the access port information configured for the user is set as the master port of the backup group; inspecting lines based on user line information after receiving said authentication message.

6. The network system of claim 5, wherein, the backup equipment is also configured as: one port of the backup equipment distinguishing the ports of different master equipments by dividing a virtual local area network.

7. The network system of claim 6, wherein, the master equipment and the backup equipment are also configured as: negotiating the master-backup relationship between the ports in the backup group via a virtual router redundancy protocol.

8. The network system of claim 5, wherein, the master equipment and the backup equipment are also configured as: negotiating the master-backup relationship between the ports in the backup group via a virtual router redundancy protocol.

* * * * *